US 8,956,055 B2

(12) United States Patent
Miyamoto et al.

(10) Patent No.: US 8,956,055 B2
(45) Date of Patent: Feb. 17, 2015

(54) METHOD FOR MANUFACTURING SPLIT BEARING RING (75) Inventors: Yuji Miyamoto, Kanagawa (JP); Masahito Matsui, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/877,067

(22) PCT Filed: Feb. 23, 2012

(86) PCT No.: PCT/JP2012/054445
§ 371 (c)(1),
(2), (4) Date: Mar. 29, 2013

(87) PCT Pub. No.: WO2012/115201
PCT Pub. Date: Aug. 30, 2012

(65) Prior Publication Data
US 2013/0209019 A1    Aug. 15, 2013

(30) Foreign Application Priority Data

Feb. 25, 2011 (JP) .................................. 2011-040051
May 27, 2011 (JP) .................................. 2011-119487
May 27, 2011 (JP) .................................. 2011-119488
Feb. 22, 2012 (JP) .................................. 2012-036462

(51) Int. Cl.
*F16C 33/60*     (2006.01)
*F16C 33/64*     (2006.01)
(Continued)

(52) U.S. Cl.
CPC . *F16C 33/60* (2013.01); *B26F 3/00* (2013.01); *F16C 33/64* (2013.01); *B23D 31/003* (2013.01);
(Continued)

(58) Field of Classification Search
CPC .......... F16C 33/60; F16C 33/64; B21D 53/10
USPC ......... 384/127, 273, 275, 288, 294, 296, 513, 384/570, 577, 622–623; 29/898.13, 29/898.054, 898.063, 898.066
See application file for complete search history.

(56) References Cited

U.S. PATENT DOCUMENTS 2,258,834 A * 10/1941 Willi .............................. 384/291
3,335,481 A *  8/1967 Haentjens .................. 29/898.07
(Continued)

FOREIGN PATENT DOCUMENTS

CA    2559757 A1 * 10/2005  ................ F16C 9/04
CN    1934282 A      3/2007
(Continued)

OTHER PUBLICATIONS

International Search Report (PCT/ISA/210 & PCT/ISA/220) dated May 29, 2012 from the International Searching Authority in counterpart application No. PCT/JP2012/054445.
(Continued)

Primary Examiner — Marcus Charles
(74) Attorney, Agent, or Firm — Sughrue Mion, PLLC (57) ABSTRACT A split bearing ring according to the invention includes two or more split portions into which the split bearing ring is divided with respect to a circumferential direction. Surfaces of the split portions other than circumferential end faces of the spit portions have hardness of HRC 59 or higher, the surfaces of the split portions other than the circumferential end faces are quenched and tempered, and the surfaces of the split portions other than the circumferential end faces have a prior austenite grain size of No. 6 or above. The split portions are formed by applying a load to a bearing ring such that stress generated on one end side of the bearing ring with respect to an axial direction is larger than stress generated on the other end side of the bearing ring with respect to the axial direction.

6 Claims, 4 Drawing Sheets (51) Int. Cl.
  *B26F 3/00* (2006.01)
  *B23D 31/00* (2006.01)
  *F16C 19/26* (2006.01)

(52) U.S. Cl.
  CPC ............ *F16C 2240/48* (2013.01); *F16C 19/26* (2013.01); *F16C 2223/10* (2013.01); *F16C 2202/04* (2013.01); *F16C 2220/80* (2013.01)
  USPC ................. 384/570; 384/273; 29/898.054

(56) References Cited

U.S. PATENT DOCUMENTS

| | | | | |
|---|---|---|---|---|
| 3,361,502 | A | * | 1/1968 | Weinkamer et al. ........... 384/294 |
| 3,375,563 | A | * | 4/1968 | Weinkamer et al. ...... 29/898.058 |
| 4,714,356 | A | * | 12/1987 | Damour et al. ............... 384/275 |
| 4,845,817 | A | * | 7/1989 | Wilgus ..................... 29/898.054 |
| 5,208,979 | A | * | 5/1993 | Schmidt ..................... 29/888.09 |
| 5,287,623 | A | * | 2/1994 | Francis et al. ........... 29/898.062 |
| 5,536,089 | A | | 7/1996 | Weber et al. |
| 6,916,117 | B2 | * | 7/2005 | Mayer ........................... 384/291 |
| 7,930,827 | B2 | * | 4/2011 | Sandin ..................... 29/898.069 |
| 2008/0131041 | A1 | * | 6/2008 | Nakano et al. ................ 384/127 |
| 2009/0142013 | A1 | * | 6/2009 | Murata et al. ................ 384/570 |
| 2011/0064350 | A1 | * | 3/2011 | Yamakawa et al. ........... 384/577 |

FOREIGN PATENT DOCUMENTS

| | | | | |
|---|---|---|---|---|
| DE | 4306280 | A1 | 9/1994 | |
| JP | 53037262 | A * | 4/1978 | ............. F16C 17/02 |
| JP | 54163247 | A | 12/1979 | |
| JP | 5544169 | A | 3/1980 | |
| JP | 55044169 | A * | 3/1980 | ............. F16C 33/14 |
| JP | 5563009 | A | 5/1980 | |
| JP | 59212524 | A | 12/1984 | |
| JP | 6040458 | U | 3/1985 | |
| JP | 01266321 | A * | 10/1989 | ............. F16C 33/60 |
| JP | 2-72220 | A | 3/1990 | |
| JP | 4357325 | A | 12/1992 | |
| JP | 07024669 | A * | 1/1995 | ............. B23P 21/00 |
| JP | 7506661 | A | 7/1995 | |
| JP | 10184674 | A | 7/1998 | |
| JP | 1143738 | A | 2/1999 | |
| JP | 11218137 | A * | 8/1999 | ............. F16C 33/60 |
| JP | 2002227852 | A | 8/2002 | |
| JP | 2002256394 | A | 9/2002 | |
| JP | 2006144985 | A * | 6/2006 | |
| JP | 2008-307843 | A | 12/2008 | |
| JP | 2009162271 | A * | 7/2009 | |
| JP | 2009281397 | A | 12/2009 | |
| JP | 201071438 | A | 4/2010 | |
| JP | 2010255695 | A | 11/2010 | |
| JP | 2011241894 | A * | 12/2011 | |
| JP | 2012177409 | A * | 9/2012 | |
| JP | 2012177427 | A * | 9/2012 | |
| WO | 9420765 | A1 | 9/1994 | |

OTHER PUBLICATIONS

Written Opinion (PCT/ISA/237) dated May 29, 2012 from the International Searching Authority in counterpart application No. PCT/JP2012/054445.

Communication dated Apr. 8, 2014 from the State Intellectual Property Office of P.R. China in a counterpart application No. 201280000443.X.

* cited by examiner

METHOD FOR MANUFACTURING SPLIT BEARING RING

CROSS REFERENCE RELATED TO APPLICATIONS

This is a National Phase Application in the United States of International Patent Application PCT/JP 2012/054445 filed Feb. 23, 2012, which claims priority from Japanese Patent Application No. 2011-040051, filed Feb. 25, 2011, Japanese Patent Application No. 2011-119487, filed May 27, 2011, Japanese Patent Application No. 2011-119488, filed May 27, 2011, Japanese Patent Application No. 2012-036462, filed Feb. 22, 2012, and PCT/JP2012/054445, filed Feb. 23, 2012. The entire disclosures of the above patent applications are hereby incorporated by reference.

TECHNICAL FIELD

The present invention relates to a split bearing ring and its manufacturing method.

BACKGROUND ART

Conventionally, a bearing ring for use in a rolling bearing and divided into two with respect to the circumferential direction to facilitate assembling and attachment in manufacturing is know as a split bearing ring. In general, such split bearing rings are manufactured by heat-treating an annular bearing ring, dividing it into two by cracking, recombining them together, and grind-finishing the raceway surfaces.

Various methods for dividing a bearing ring by cracking have conventionally been proposed. For example, as a method for causing a split between slits formed at both axial ends of a bearing ring, it has been proposed to form stress concentration points such as V-grooves or inducing holes in the bearing ring in advance so that the shape of the split line is controlled to be in a desired shape such as an S shape (see, e.g., Patent Documents 1-3). Also, it has been proposed to split a bearing ring so as to form a split line that is inclined with respect to the axial direction, thereby improving the adhesion between split faces (see, e.g., Patent Documents 4-7).

Further, to prevent a situation where split lines do not meet each other when cracking from both sides in the axial direction, it has been proposed to open from a slit formed on one end side in the axial direction (see, e.g., Patent document 8).

Further, in forcibly breaking and separating (cracking) a low-ductility microalloyed hot forging steel, it has been proposed to make the surface roughness Rz of fracture faces to be 30 μm to 1,000 μm to enable an easy positioning after the splitting (see, e.g., Patent document 9).

PRIOR ART DOCUMENTS

Patent Documents

Patent Document 1: JP55-044169A
Patent Document 2: JP55-063009A
Patent Document 3: JP54-163247A
Patent Document 4: JP6-040458U
Patent Document 5: JP2002-227852A
Patent Document 6: JP2009-281397A
Patent Document 7: JP2010-255695A
Patent Document 8: JP4042999B2
Patent Document 9: JP11-043738A

SUMMARY OF THE INVENTION

Problems to be Solved by the Invention

While bearing rings are required to be highly durable, in split bearing rings, flaking or crack damage may develop from a split location. It is therefore necessary to improve the strength at the split location and the adhesion between the split faces. However, when stress concentration points are provided as in Patent documents 1-3, they may become a factor in lowering the durability. Further, a bearing ring may be deformed in an elliptical shape as a result of deformation at the time of heat treatment or plastic deformation at the time of splitting, which raises a problem that the machining allowance is increased.

The present invention has been made in view of the above circumstances, and it is an object of the invention to provide a highly durable split bearing ring and its manufacturing method.

Means for Solving the Problems

The above object of the invention can be achieved by the following configuration.

(1) A split bearing ring having two or more split portions into which the split bearing ring is divided with respect to a circumferential direction, wherein surfaces of the split portions other than end faces of the spit portions with respect to the circumferential direction have hardness of HRC 59 or higher, the surfaces of the split portions other than the end faces with respect to the circumferential direction are quenched and tempered, and the surfaces of the split portions other than the end faces with respect to the circumferential direction have a prior austenite grain size of No. 6 or above, and wherein the split portions are formed by applying a load to a bearing ring such that stress generated on one end side of the bearing ring with respect to a axial direction is larger than stress generated on the other end side of the bearing ring with respect to the axial direction.

(2) The split bearing ring according to (1), wherein the end faces of the split portions with respect to the circumferential direction have arithmetic average roughness Ra of 30 μm or higher, and the end faces of the split portions with respect to the circumferential direction are dimpled.

(3) The split bearing ring according to (1) or (2), wherein the split portions are formed by causing a crack to develop from the one end side of the bearing ring with respect to the axial direction.

(4) A method for manufacturing the split bearing ring as set forth in any one of (1) to (3), comprising:

splitting the bearing ring by applying the load from above in a vertical direction such that the stress generated on the one end side of the bearing ring with respect to the axial direction is larger than the stress generated on the other end side of the bearing ring with respect to the axial direction.

(5) The method of manufacturing the split bearing ring according to (4), further comprising providing a slit on the one end side, wherein the stress generated at the slit on the one end side is larger than the stress generated on the other end side.

(6) The method of manufacturing the split bearing ring according to (5), further comprising forming a slit on the other end side, wherein the stress generated at the slit on the one end side is larger than the stress generated at the slit on the other end side.

(7) The method of manufacturing the split bearing ring according to any one of (4) to (6), further comprising:

inserting a columnar support jig into a radially inner side of the bearing ring; and supporting an inner circumferential surface of the bearing ring with the support jig, wherein an angle of a line connecting a contact point and a radial center of the bearing ring with respect to a plane perpendicular to the direction in which the load is applied to the bearing ring and including the radial center of the bearing ring is 15° to 35°, the contact point being closest to a portion of the bearing ring to which the load is applied in a region where the bearing ring and the support jig contact each other.

In this specification, the one end side and the other end side with respect to the axial direction are one side and its opposite side in the axial direction with the axial center being the boundary.

Advantages of the Invention

According to a split bearing ring and its manufacturing method of the invention a highly durable split bearing ring and its manufacturing method can be provided.

EMBODIMENTS OF THE INVENTION

Hereinafter, an embodiment of a method of manufacturing a split bearing ring according to the present invention will be described in detail with reference to the drawings.

Figure 1:
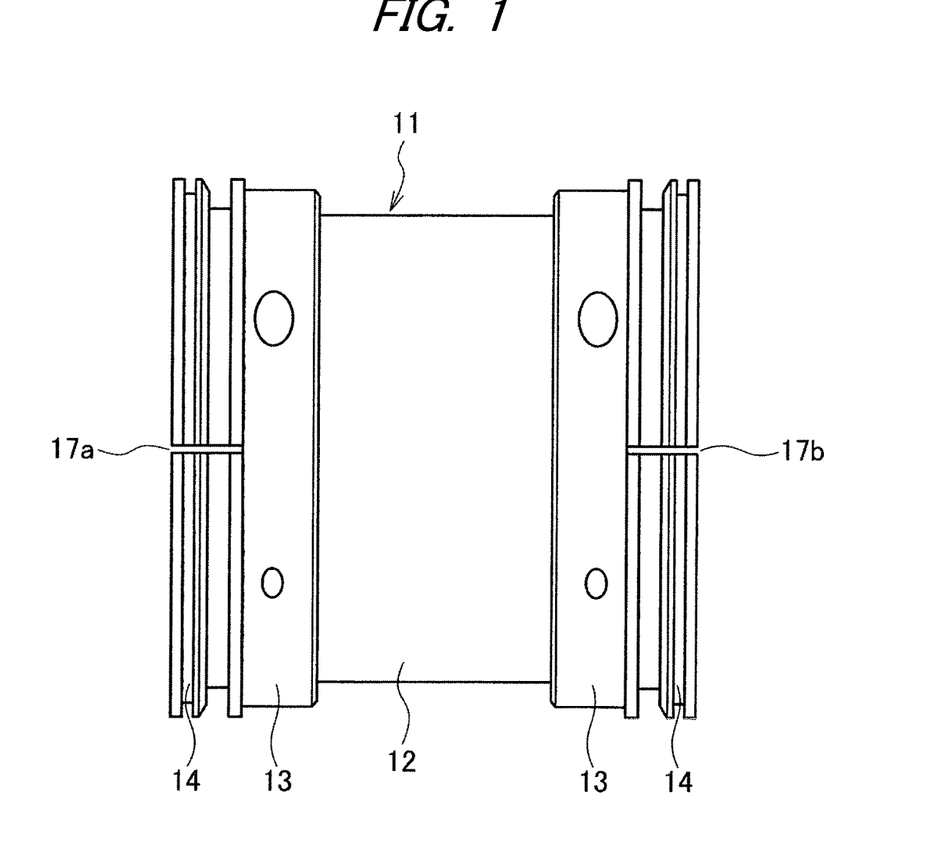
FIG. 1 is a plan view of an inner ring before being split in a method of manufacturing a split bearing ring according to an embodiment of the present invention.
Figure 2:
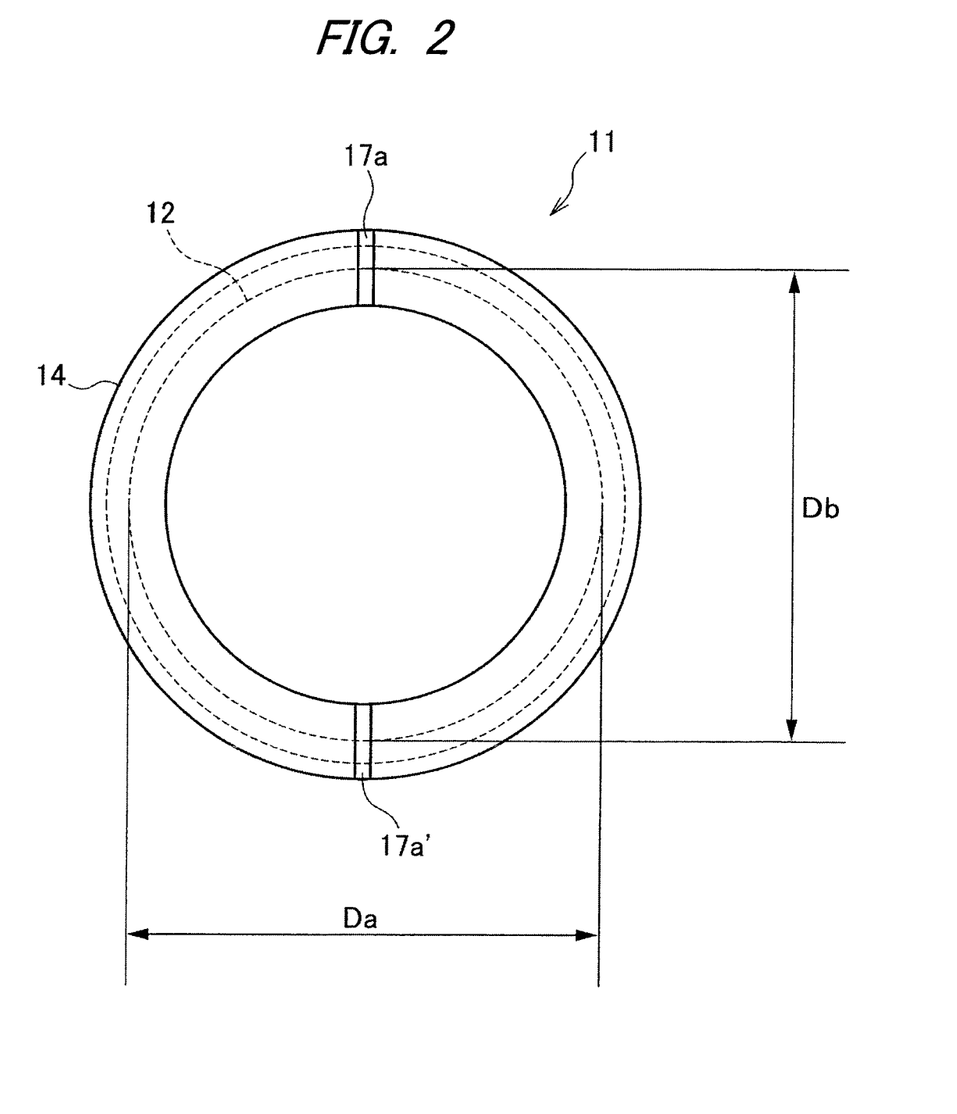
FIG. 2 is a side view of FIG. 1.

In the method of manufacturing the split bearing ring according to the embodiment, as shown in FIGS. 1 and 2, an inner ring 11 before splitting has an annular body 12, annular flanges 13, 13 disposed on the respective axial sides of the body 12, and end portions 14, 14 disposed at respective axial ends of the inner ring 11. The outer circumferential surface of the body 12 serves as a raceway surface for rolling elements (not shown). To facilitate cracking of the inner rung 11, the end portions 14 are provided with slits 17a, 17b extending in the axial direction. The slits 17a, 17b are provided on the respective sides in the axial direction so as to be located on a straight line. The end portions 14 are also provided with slits 17a', 17b' (not shown) at locations rotated by 180° in the circumferential direction from the locations where the slits 17a, 17b are provided.

To improve durability in an actual use environment, the inner ring 11 before splitting is quenched and tempered, or carburized or carbonitrided and quenched and tempered. The material of the inner ring 11 contains carbon (C) of 0.15 mass % to 1.20 mass %. C being smaller than 0.15 mass % improves the durability of the inner ring 11 but is not preferable because it makes it difficult to cause cracking. On the other hand, the C being larger than 1.20 mass % is not preferable because sufficient durability cannot be obtained.

The contents of components of the inner ring 11 other than C are preferably in the following ranges. Si is a carburization-resistant element and, therefore, its content is preferably equal to or smaller than 2 mass % and more preferably equal to or smaller than 0.35 mass %. To increase workability, the content of Cr is preferably equal to or smaller than 20 mass % and more preferably equal to or smaller than 1.2 mass %. To suppress increase of crystal grain size, the content of Mn is preferably equal to or smaller than 2 mass % and more preferably equal to or smaller than 0.85 mass %. The content of Mo is preferably equal to or smaller than 1 mass % and more preferably equal to or smaller than 0.3 mass %, because a large Mo content results in cost increase. To increase workability, the content of Ni is preferably equal to or smaller than 4 mass % and more preferably equal to or smaller than 0.25 mass %. Other components are preferably Fe and unavoidable impurities.

The surface hardness of the inner ring 11 is HRC 59 or higher. The prior austenite grain size (JIS G0551) of the surface of the inner ring 11 is No. 6 or above. With the surface hardness of the inner ring 11 being HRC 59 or higher, the durability can be increased and, in addition, the plastic deformation at the time of splitting is kept small and the adhesion between split faces is improved. With the prior austenite grain size being No. 6 or above, while the splitting load is increased, crystal fracture faces with minute cracks are preventing from being formed on split faces and the durability is improved. The durability is improved as crystal grains become smaller. Here, the "split faces" are end faces, with respect to the circumferential direction, of each of the split portions into which the inner ring 11 has been divided.

Figure 3:
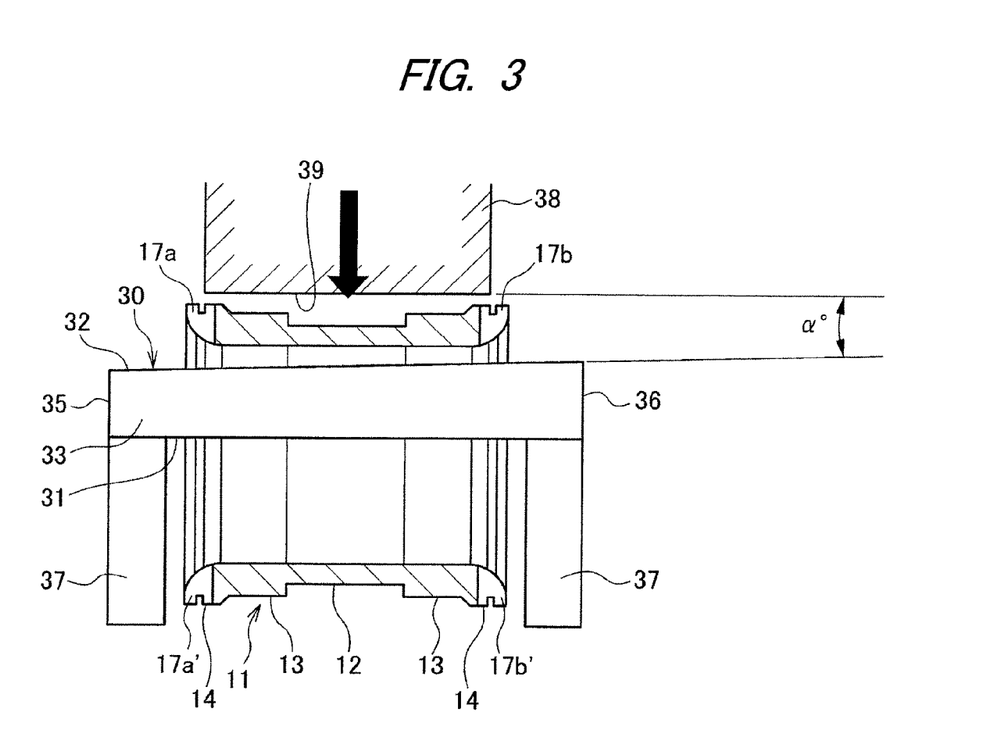
FIG. 3 is a axial sectional view illustrating the method of manufacturing the split bearing ring according to the embodiment of the present invention.

As shown in FIG. 3, in a method of dividing a bearing ring according to the embodiment, a support jig 30 having a bottom surface 31, a top surface 32, and side surfaces 33, 33 is inserted into the radially inner side of the cylindrical inner ring 11. In FIG. 3, for the purpose of simplification, the top surface 32 of the support jig 30 and the inner circumferential surface of the inner ring 11 are illustrated in spaced manner. The support jig 30 has such a shape that the vertical dimension decreases from one axial end portion 36 to the other axial end portion 36, and hence the top surface 32 is a slant surface. The bottom surface 31 of the support jig 30 is supported by two posts 37 at the one axial end portion 36 and the other axial end portion 36. The posts 37 have the same vertical dimension which may be any dimension as long as the inner ring 11 can be hung and held by the support jig 30.

The support jig 30 has top edges 34, 34 between the top surface 32 and the side surfaces 33, 33. The inner circumferential surface of the inner ring 11 are hung and held by these top edges 34, 34. The top edges 34 contacting the inner circumferential surface of the inner ring 11 are preferably chamfered by 1 mm to 30 mm. Chamfering of 1 mm or more prevents indentations from being formed when contacting the inner circumferential surface of the inner ring 11. Chamfering of 30 mm or less suppresses the supporting location from shifting too much after the cracking, whereby the stability is maintained. It is preferable that the chamfering profile be rounded.

To split the inner ring 11, the inner ring 11 is hung and held by the support jig 30 inserted into the radially inner side as described above such that the slits 17a, 17b are located at the top in the vertical direction. The inner ring 11 is disposed in such that the slit 17b is located on a side of the one axial end portion 36 of the support jig 30 and the slit 17a located on a side of the other axial end portion 35 of the support jig 30, and is supported by the top surface 32 (in particular, by its edges) of the support jig 30.

In this state, a bottom surface 39 of a loading jig 38 is placed on the flanges 13, 13 of the support jig 30 and adjacent to the slits 17a, 17b and a load is applied to the inner ring 11 from above in the vertical direction. In this manner, the load is applied to both axial sides of the inner ring 11 via the bottom surface 39 of the loading jig 38 from above in the vertical direction. However, as described above, the top surface 32 of the support jig 30 is higher on the one axial end portion 36 side than on of the other axial end portion 35 side. Therefore, the top surface 32 of the support jig 30 is inclined with respect to the bottom surface 39 of the loading jig 38, whereby a larger stress is generated on the slit 17b side than on the slit 17a side. This allows a crack to develop only from the slit 17b, and therefore, prevents a situation where cracks develop from both slits 17a, 17b and do not meet each other.

The inclination angle α (see FIG. 3) of the top surface 32 of the support jig 30 with respect to the bottom surface 39 of the loading jig 38 is preferably 0.2° to 3°. With the inclination angle α being 0.2° to 3°, a non-uniform load is produced while keeping stability. Therefore, a larger stress generated at one of the slits, and the splitting load can be lowered, thereby suppress change in shape of the inner ring 11 due to its plastic deformation. Further, since a stable tensile stress is always generated at the leading end of the crack generated from one of the slits, straightness of crack development is extremely high so that the crack reaches the target location (e.g., the other slit). After the inner ring 11 has been split in the axial direction from the slit 17b to the slit 17a, the inner ring 11 is rotated by 180° in the circumferential direction and a load is applied again, whereby a split inner ring having two split portions in which to the inner ring 11 is divided is obtained.

Further, it is preferable that the angle (hereinafter referred to as a contact angle) β (see FIG. 4) formed by the line connecting the radial center of the inner ring 11 and a contact point (supporting point) with respect to the plane perpendicular to the direction in which the load is applied to the inner ring 11 and including the radial center of the inner ring 11 be 15° to 35°, the contact point being on the top edge 34 of the support jig 30 contacting the inner circumferential surface of the inner ring 11 and being closest to the portion of the inner ring 11 to which the load is applied. When the contact angle β is changed, the range of the supporting point changes accordingly. With the contact angle β being 15° to 35°, stability can maintained such that the splitting load does not become too large and that the supporting location does not shift too much after the cracking.

The carburized or carbonitrided inner ring 11 has high toughness inside and hence the splitting load is increased. When the splitting load is high, the plastic deformation amount is large, which raises problems that the grinding allowance is increased to cause cost increase and that deformation may occur when stress is released by grinding. It is therefore preferable to perform cracking in an environment that makes it as brittle as possible. For example, a sub-zero treatment may be performed by utilizing low-temperature brittleness. In this respect, from the viewpoint of durability, the surface retained austenite is preferably 20 volume % to 45 volume %. Placing at least the origin potion of a split face in water is preferable because the splitting load can be reduced greatly.

The quenched and tempered inner ring 11 tends to have rough split faces. With the arithmetic average roughness Ra of split faces being 30 μm or higher, the adhesion between the split faces is increased by the roughness and the durability of split inner rings is further improved. To suppress occurrence of cracks, the arithmetic average roughness Ra of split faces is preferably 1,000 μm or lower, and more preferably 500 μm or lower. The split faces are preferably dimpled. This further increases the adhesion between the split faces, and further improves durability.

In this embodiment, the support jig 30 is formed in a columnar shape, the support jig 30 itself is supported by the two posts 37, and the inner ring 11 is merely hung and held by the top edges 34. As such, it can be applied to inner rings 11 of various sizes.

The support jig 30 is preferably formed without heat treatment or the like to have the same hardness as its material such as carbon steel for mechanical structures. In contrast, as described above, the inner ring 11 is quenched and tempered, so that the inner circumferential surface of the inner ring 11 has higher hardness than the support jig 30. This prevents the inner circumferential surface of the inner ring 11 from being scratched and from being lowered in circularity due to deformation of the inner ring 11.

The support jig 30 may be made of a material having a smaller Young's modulus than the material of the inner ring 11, such as cast iron, a copper-based metal and aluminum. By forming the support jig 30 using such a material, even when the contact pressure between the inner circumferential surface of the inner ring 11 and the top edges 34 becomes high, the support jig 30 is deformed earlier than the inner ring 11, which prevents the inner circumferential surface of the inner ring 11 from being scratched and from being lowered in circularity due to deformation of the inner ring 11.

As described above, according to the split bearing ring and its manufacturing method of this embodiment, the inner ring 11 is divided with respect to the circumferential direction by causing a crack to develop only from the one slit 17b. Therefore, disorder of cut faces is suppressed and favorable cut faces can be obtained without increasing manufacturing cost. Further, deformation of the bearing ring due to splitting is suppressed so that the circularity of the raceway surface can be made high. Still further, the adhesion between split face is increased, whereby the durability of split inner rings can be further improved.

The invention is not limited to the embodiment described above, and various modifications and improvements may be made therein. While the above embodiment has been described in connection with the case of splitting the inner ring 11 as a example, the invention can also be applied to a case of splitting an outer ring. While the above embodiment has been described in connection with the case of splitting the bearing ring into two parts as an example, the bearing ring may be split into three or more parts. In the above embodiment, the inclination angle α is provided by forming the top surface 32 of the support jig 30 as a slant surface, however, it is not limited to this, and the bottom surface of the support jig 30 may be formed as a slant surface, or the inclination angle α may be provided by using a spacer such as a shim. In the above embodiment, the inner ring 11 is formed with the slits on both end sides with respect to the axial direction. However, a slit may be formed only on the one end side or only on the other end side with respect to the axial direction. Further, a slit may not be formed at either axial end portions of the inner ring 11.

EXAMPLES

Figure 4:
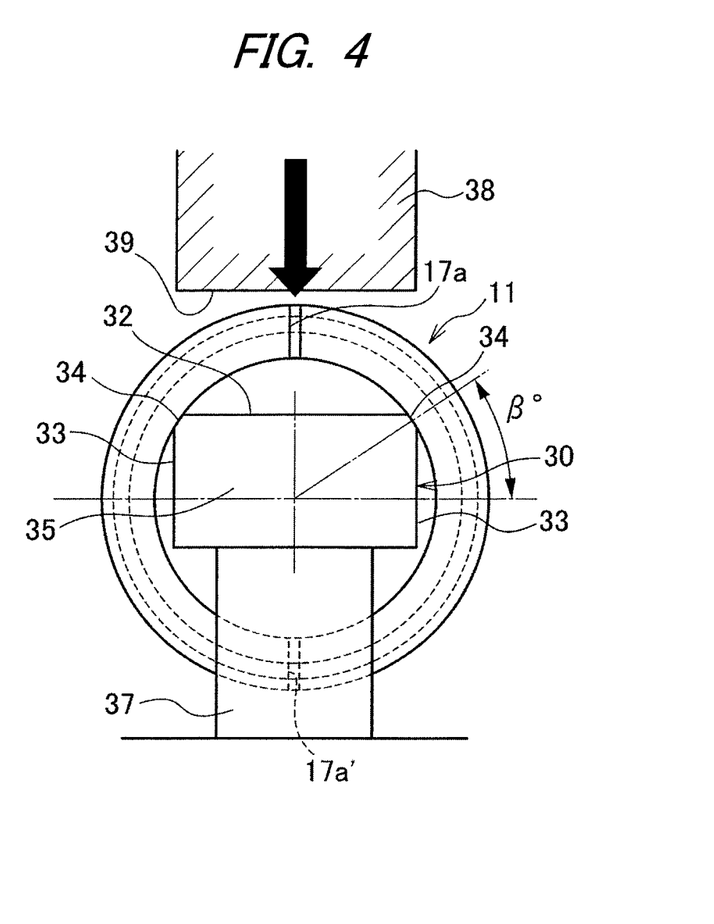
FIG. 4 is a side view of FIG. 3.

Inner rings of cylindrical roller bearings were produced using materials shown in Table 1, slits were formed on both end sides of each inner ring with respect to the axial direction, and the inner rings were split under conditions shown in Table 1 and FIGS. 3 and 4. As shown in Table 1, each inner ring was split after a heat treatment such as quenching and tempering or carbonitriding or carburizing followed by quenching and tempering. As for the dimensions of the inner rings, the inner diameter was 109 mm, the outer diameter was 157 mm, and the axial length was 154 mm. Table 1 shows surface hardness (HR), a crystal grain size, an inclination angle α, a contact angle β, split face roughness (μmRa), a split face form, a splitting load applied for splitting, stability of splitting, a deformation amount (μm) due to splitting, and a result of a durability test. The deformation amount is a value of Da−Db, i.e., the difference between a maximum value and a minimum value of the raceway surface diameter (see FIG. 2), when recombined after the splitting. In the durability test, each operation was carried out at a rotation speed of 15 rpm, with a radial load of 500 kN and with oil-air lubrication, and after a lapse of 1000 hours, ones with no cracks on the split faces were evaluated as "○", and others with cracks were evaluated as "x".

the range of the invention, the splitting load was so high and caused large deformation. Thus, a durability test could not be carried out. In Comparative Example 3, the crystal grain size is outside the range of the invention and the split faces are not dimpled. This Comparative Example 3 did not pass the durability test because a crack developed in the split faces during the durability test, from which it is understood that its life is short.

Among Examples 1-25, in Example 15, the contact angle β is smaller than the preferable range of the invention. Although this Example 15 passed the durability test, the locations where the inner ring 11 was hung and held by the top edges 34 were easily shifted upward during splitting and the stability was thus somewhat low. Example 19 in which the contact

TABLE 1

|  | Material | Heat Treatment | Surface Hardness (HRC) | Crystal Grain Size (JIS G0551) | Inclination Angle α° | Contact Angle β° | Split Face Roughness μmRa | Split Face Form | Split Load kN | Split Stability | Deformation Amount μm | Durability Test |
|---|---|---|---|---|---|---|---|---|---|---|---|---|
| Ex. 1 | SUJ2 | Q, T | 59 | 6 | 0.2 | 25 | 30 | Dimpled | 130 | Excellent | 114 | ○ |
| Ex. 2 | SUJ3 | Q, HTT | 59 | 10 | 0.2 | 25 | 45 | Dimpled | 150 | Excellent | 146 | ○ |
| Ex. 3 | SUJ2 | Q, T | 62 | 10 | 0.2 | 25 | 34 | Dimpled | 130 | Excellent | 102 | ○ |
| Ex. 4 | SUJ2 | Q, T | 62 | 10 | 0.2 | 25 | 34 | Dimpled | 130 | Excellent | 105 | ○ |
| Ex. 5 | SUJ2 | Q, T | 62 | 10 | 0.2 | 35 | 35 | Dimpled | 150 | Excellent | 131 | ○ |
| Ex. 6 | SUJ2 | Q, T | 62 | 10 | 0.4 | 15 | 34 | Dimpled | 90 | Excellent | 102 | ○ |
| Ex. 7 | SUJ2 | Q, T | 62 | 10 | 0.4 | 25 | 35 | Dimpled | 100 | Excellent | 100 | ○ |
| Ex. 8 | SUJ2 | Q, T | 62 | 10 | 0.4 | 35 | 37 | Dimpled | 120 | Excellent | 101 | ○ |
| Ex. 9 | SUJ2 | Q, T | 62 | 10 | 1.0 | 15 | 34 | Dimpled | 90 | Excellent | 103 | ○ |
| Ex. 10 | SUJ2 | Q, T | 62 | 10 | 1.0 | 25 | 35 | Dimpled | 100 | Excellent | 103 | ○ |
| Ex. 11 | SUJ2 | Q, T | 62 | 10 | 1.0 | 35 | 34 | Dimpled | 120 | Excellent | 102 | ○ |
| Ex. 12 | SUJ2 | Q, T | 62 | 10 | 1.5 | 15 | 37 | Dimpled | 90 | Excellent | 103 | ○ |
| Ex. 13 | SUJ2 | Q, T | 62 | 10 | 1.5 | 25 | 34 | Dimpled | 100 | Excellent | 102 | ○ |
| Ex. 14 | SUJ2 | Q, T | 62 | 10 | 1.5 | 35 | 37 | Dimpled | 120 | Excellent | 100 | ○ |
| Ex. 15 | SUJ2 | Q, T | 62 | 10 | 2.0 | 5 | 40 | Dimpled | 90 | Good | 101 | ○ |
| Ex. 16 | SUJ2 | Q, T | 62 | 10 | 2.0 | 15 | 37 | Dimpled | 90 | Excellent | 103 | ○ |
| Ex. 17 | SUJ2 | Q, T | 62 | 10 | 2.0 | 25 | 39 | Dimpled | 100 | Excellent | 105 | ○ |
| Ex. 18 | SUJ2 | Q, T | 62 | 11 | 2.0 | 35 | 44 | Dimpled | 120 | Excellent | 102 | ○ |
| Ex. 19 | SUJ2 | Q, T | 62 | 10 | 2.0 | 40 | 40 | Dimpled | 190 | Excellent | 180 | ○ |
| Ex. 20 | SUJ2 | Q, T | 62 | 11 | 3.0 | 15 | 34 | Dimpled | 90 | Excellent | 100 | ○ |
| Ex. 21 | SUJ2 | Q, T | 62 | 11 | 3.0 | 25 | 33 | Dimpled | 100 | Excellent | 101 | ○ |
| Ex. 22 | SUJ2 | Q, T | 62 | 11 | 3.0 | 35 | 32 | Dimpled | 120 | Excellent | 100 | ○ |
| Ex. 23 | SUJ2 | Q, T | 62 | 10 | 4.0 | 25 | 32 | Dimpled | 100 | Good | 90 | ○ |
| Ex. 24 | SCR420 | CSQ, T | 61 | 9 | 0.4 | 25 | 60 | Dimpled | 165 | Excellent | 144 | ○ |
| Ex. 25 | SCR420 | CSQ, T | 61 | 8 | 0.4 | 35 | 60 | Dimpled | 180 | Excellent | 155 | — |
| C-Ex. 1 | SUJ2 | Q, T | 62 | 10 | 0.0 | 15 | 32 | Dimpled | 220 | Poor | 370 | — |
| C-Ex. 2 | SCR420 | CSQ, T | 55 | 8 | 2.0 | 15 | 31 | Dimpled | 350 | Excellent | 500 | |
| C-Ex. 3 | SCR420 | CDQ, T | 60 | 5 | 2.0 | 15 | 50 | Grain Boundary | 90 | Excellent | 84 | x |

Ex.: Example,
C-Ex.: Comparative Example
Q: Quenching,
T: Tempering,
HTT: High Temperature Tempering,
CSQ: Carburization Secondary Quenching,
CDQ: Carburization Direct Quenching It is seen from Table 1 that Examples 1-25 in which conditions such as the heat treatment, surface hardness (HRC), crystal grain size, and split face form are within the range of the invention passed durability tests because the adhesion between the split faces is improved.

In contrast, in Comparative Example 1, the inclination angle α is equal to 0°, that is, the stress generated on one axial end side of the bearing ring with respect to the axial direction is equal to the stress generated on the other end side of the bearing ring with respect to the axial direction. In this Comparative Example 1, the splitting load was too high and caused large deformation, and also split lines did not meet each other. Thus, a durability test could not be carried out. Also in Comparative Example 2 in which the surface hardness is outside angle β is larger than the preferable range of the invention passed a durability test, but the splitting load was large. In Example 23, the inclination angle α is outside the preferable range of the invention. Example 23 passed a durability test, but the area in which the bottom surface 39 of the loading jig 38 contacts the inner ring 11 at a start of splitting is small so that the inner ring 11 easily shifts in the axial direction. Thus, the stability is somewhat low.

The effectiveness of the ranges and the preferable ranges of the invention has been verified by the above results.

While the embodiment and Examples of the invention have been described above, the invention is not limited to the above embodiment, and various modifications may be made therein within the scope as defined by the claims.

DESCRIPTION OF REFERENCE SIGNS

11 Inner Ring
17a, 17b, 17a' Slit
30 Support Jig
32 Top Surface
38 Loading Jig

The invention claimed is:

1. A method for manufacturing a split bearing ring, the split bearing ring comprising two or more split portions into which the split bearing ring is divided with respect to a circumferential direction,
   wherein surfaces of the split portions other than end faces of the spit portions with respect to the circumferential direction have hardness of HRC 59 or higher, the surfaces of the split portions other than the end faces with respect to the circumferential direction are quenched and tempered, and the surfaces of the split portions other than the end faces with respect to the circumferential direction have a prior austenite grain size of No. 6 or above according to JIS G0551, and
   wherein the method comprises:
   inserting a support jig into a radially inner side of a bearing ring; and
   splitting the bearing ring to form the split portions by applying a load to the bearing ring such that stress generated on one end side of the bearing ring with respect to an axial direction of the bearing ring is larger than stress generated on the other end side of the bearing ring with respect to the axial direction,
   wherein the load is applied to both axial sides of the bearing ring in a vertical direction with respect to the axial direction.

2. The method according to claim 1, wherein the end faces of the split portions with respect to the circumferential direction have arithmetic average roughness Ra of 30 gm or higher.

3. The method according to claim 1, wherein the split portions are formed by causing a crack to develop only from the one end side of the bearing ring with respect to the axial direction.

4. The method according to claim 1, further comprising providing a slit on the one end side,
   wherein the stress generated at the slit on the one end side is larger than the stress generated on the other end side.

5. The method according to claim 4, further comprising forming a slit on the other end side,
   wherein the stress generated at the slit on the one end side is larger than the stress generated at the slit on the other end side.

6. The method according to claim 1, further comprising:
   supporting an inner circumferential surface of the bearing ring with the support jig,
   wherein the support jig is columnar, and
   wherein an angle of a line connecting a contact point and a radial center of the bearing ring with respect to a plane perpendicular to the direction in which the load is applied to the bearing ring and including the radial center of the bearing ring is 15° to 35°, the contact point being closest to a portion of the bearing ring to which the load is applied in a region where the bearing ring and the support jig contact each other.

\* \* \* \* \*